(12) United States Patent
Jones-McFadden et al.

(10) Patent No.: US 10,057,145 B2
(45) Date of Patent: Aug. 21, 2018

(54) ESTABLISHING AN OPERATIVE CONNECTION BETWEEN A COMPUTING NETWORK AND A THIRD-PARTY COMPUTING SYSTEM FOR TRANSMITTING INDICATIONS OF PROCESS RELATIONSHIPS

(71) Applicant: Bank of America Corporation, Charlotte, NC (US)

(72) Inventors: Alicia C. Jones-McFadden, Fort Mill, SC (US); Matthew Hsieh, Charlotte, NC (US); Scott R. Enscoe, Charlotte, NC (US); Raghav Anand, Chadds Ford, PA (US); Michael Anderson, Colleyville, TX (US); Elizabeth Ann Miller, Brooklyn, NY (US); Daniel Shilov, Nashua, NH (US); Alicia Anli Salvino, Rockville, MD (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 199 days.

(21) Appl. No.: 15/290,750

(22) Filed: Oct. 11, 2016

(65) Prior Publication Data
US 2018/0102955 A1 Apr. 12, 2018

(51) Int. Cl.
| | |
|---|---|
| *G06F 15/177* | (2006.01) |
| *H04L 12/26* | (2006.01) |
| *H04L 29/08* | (2006.01) |
| *H04L 12/24* | (2006.01) |
| *G06Q 40/00* | (2012.01) |

(52) U.S. Cl.
CPC ............. *H04L 43/08* (2013.01); *G06Q 40/12* (2013.12); *H04L 41/0816* (2013.01); *H04L 43/16* (2013.01); *H04L 67/20* (2013.01); *H04L 67/22* (2013.01)

(58) Field of Classification Search
CPC ......... H04L 43/08; H04L 43/16; H04L 67/20; H04L 67/22; H04L 41/0816
USPC .................................................. 709/221, 224
See application file for complete search history.

(56) References Cited

U.S. PATENT DOCUMENTS

| | | | |
|---|---|---|---|
| 6,021,883 | A  | 2/2000 | Casanova et al. |
| 7,899,750 | B1 | 3/2011 | Klieman et al. |
| 7,945,512 | B2 | 5/2011 | Scipioni et al. |
| 8,249,986 | B2 | 8/2012 | Scipioni et al. |
| 8,260,699 | B2 | 9/2012 | Smith et al. |
| 8,380,623 | B1 | 2/2013 | Ley et al. |
| 8,639,633 | B2 | 1/2014 | Schneider |

(Continued)

OTHER PUBLICATIONS

"Method for Efficient Money Management/Control for personal bank accounts," IBM, Feb. 5, 2005.

*Primary Examiner* — Philip B Tran
(74) *Attorney, Agent, or Firm* — Michael A. Springs; Moore & Van Allen PLLC; James C. Edwards

(57) ABSTRACT

Pre-configured resource acquisitions are established and maintained in a database. The occurrence or imminent occurrence of an computer network-based event that impacts the pre-configured resource acquisition are monitored or tracked and, based on the determined impact of the computer network-based event, at least one of the occurrence of the computer network-based event is prevented or the user is notified of the impact of the computer-network based event on the pre-configured resource acquisition.

19 Claims, 3 Drawing Sheets

(56) References Cited

U.S. PATENT DOCUMENTS

| | | | |
|---|---|---|---|
| 8,700,512 | B1 | 4/2014 | Kuznetsov |
| 9,256,876 | B2 | 2/2016 | Vasant Akole et al. |
| 2002/0161678 | A1 | 10/2002 | Jaffe |
| 2003/0009402 | A1 | 1/2003 | Mullen et al. |
| 2003/0220863 | A1* | 11/2003 | Holm ............... G06Q 20/04 705/37 |
| 2005/0177499 | A1 | 8/2005 | Thomas |
| 2005/0222951 | A1 | 10/2005 | Sherman |
| 2006/0190368 | A1* | 8/2006 | Kesterman ......... G06Q 40/00 705/35 |
| 2007/0078695 | A1* | 4/2007 | Zingelewicz ...... G06Q 10/06 705/7.28 |
| 2008/0021885 | A1 | 1/2008 | Jones |
| 2008/0217397 | A1 | 9/2008 | Degliantoni et al. |
| 2009/0063332 | A1 | 3/2009 | Tabaczynski et al. |
| 2009/0192947 | A1 | 7/2009 | Kenigsberg et al. |
| 2009/0271287 | A1 | 10/2009 | Halpern |
| 2009/0327308 | A1 | 12/2009 | Carter et al. |
| 2010/0106583 | A1 | 4/2010 | Etheredge et al. |
| 2010/0161600 | A1 | 6/2010 | Higgins et al. |
| 2010/0299186 | A1 | 11/2010 | Cameo et al. |
| 2011/0055008 | A1 | 3/2011 | Feuerstein et al. |
| 2011/0087594 | A1 | 4/2011 | Bierer et al. |
| 2011/0112985 | A1 | 5/2011 | Kocmond |
| 2011/0145109 | A1 | 6/2011 | Watson |
| 2011/0191173 | A1 | 8/2011 | Blackhurst et al. |
| 2011/0213704 | A1* | 9/2011 | Nagarajan ......... G06Q 10/10 705/42 |
| 2011/0231305 | A1 | 9/2011 | Winters |
| 2011/0246279 | A1 | 10/2011 | Joa et al. |
| 2011/0246306 | A1 | 10/2011 | Blackhurst et al. |
| 2012/0047022 | A1 | 2/2012 | Shamim et al. |
| 2012/0059751 | A1 | 3/2012 | Hangartner et al. |
| 2012/0123857 | A1 | 5/2012 | Surve et al. |
| 2012/0197783 | A1 | 8/2012 | Hunter et al. |
| 2012/0265819 | A1 | 10/2012 | McGann et al. |
| 2012/0265874 | A1* | 10/2012 | Hoh ............... G06Q 10/02 709/224 |
| 2013/0006756 | A1 | 1/2013 | Heo |
| 2013/0073546 | A1 | 3/2013 | Yan et al. |
| 2013/0179254 | A1 | 7/2013 | Joa et al. |
| 2013/0325667 | A1 | 12/2013 | Satyavolu et al. |
| 2014/0046748 | A1 | 2/2014 | Nagarajan et al. |
| 2014/0136323 | A1 | 5/2014 | Zhang et al. |
| 2014/0279158 | A1* | 9/2014 | Friedman ......... G06Q 30/08 705/26.3 |
| 2015/0081405 | A1 | 3/2015 | Ross et al. |
| 2015/0220999 | A1 | 8/2015 | Thornton et al. |
| 2016/0023526 | A1 | 1/2016 | Lavoie |
| 2016/0210700 | A1 | 7/2016 | Ventura et al. |
| 2016/0284009 | A1* | 9/2016 | Shah ............... G06Q 30/0633 |
| 2016/0371689 | A1* | 12/2016 | Brown ............. G06Q 20/405 |
| 2017/0244459 | A1* | 8/2017 | Chen ............... H04B 7/0617 |

\* cited by examiner

ESTABLISHING AN OPERATIVE CONNECTION BETWEEN A COMPUTING NETWORK AND A THIRD-PARTY COMPUTING SYSTEM FOR TRANSMITTING INDICATIONS OF PROCESS RELATIONSHIPS

FIELD OF THE INVENTION

In general, embodiments herein disclosed relate to computing processing and, more specifically establishing pre-configured resource acquisition, tracking imminent occurrence of an computer network-based event that impact the pre-configured resource acquisition and either preventing the occurrence of the computer network-based event or notifying the user of the impact of the computer-network based event.

BACKGROUND

Computer databases may store information associated with pre-configured acquisition of resources between different entities. However, computer network-based events may occur that have an impact on the preconfigured acquisition of resources. In the event that the impact impairs the ability of the pre-configured acquisition of resources from occurring or delays the occurrence, it may beneficial to prevent the occurrence of the computer network-based event and/or notify the acquiring entity of the impact that the computer network-based event has on the pre-configured acquisition of resources.

Therefore, a need exists to develop ways to monitor/track the imminent occurrence of computer network based events that have an impact on the pre-configured acquisition of resources, determine the level of impact that the computer network-based event has on the pre-configured acquisition of resources, and based on the level of impact possibly prevent the occurrence of the computer network based event and/or notify the entity associated with the pre-configured acquisition of resources of the impact that the computer network-based event has on the pre-configured acquisition of resources.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Systems, apparatus, and the like are described below that provide for establishing and maintaining a database of pre-configured acquisitions of resources and tracking/monitoring computer network-based events that may potentially have an impact on the pre-configured acquisitions of resources. When a determination is made that a computer network-based event is imminent, the impact of the event is determined based on parameters associated with the event and attributes associated with the pre-configured acquisition. Once the impact of the event has been determined and, in some embodiments the level of impact, at least a portion of the event is prevented from occurring and/or the entity associated with the pre-configured acquisition is notified of the impact of the event on the pre-configured acquisition.

A system for monitoring events having an effect on a pre-configured acquisition define first embodiments of the invention. The system includes a database accessible across a distributed computing network, which is configured to store information related to a pre-configured acquisition of a resource provided to a first entity by a second entity. The system additionally includes a computing platform having a memory and at least one processor in operable communication with the memory. Additionally, the system includes an impact event tracking module that is stored in the memory and executable by the processor. The impact event tracking module is configured to receive an input that indicates an imminent occurrence of a computing network-based event having a potential impact on the pre-configured acquisition and, in response to the input or attributes associated with the input, access the distributed computing network to retrieve, from the database, the information related to the pre-configured acquisition. In response to retrieving the information related to the pre-configured acquisition, the module is configured to determine an impact of the computing network-based event on the pre-configured acquisition based on at least one parameter associated with the computing network-based event and the information related to the pre-configured acquisition. Further, the module is configured to, in response to determining the impact, perform at least one of (i) prevent occurrence of at least a portion of the computer network-based event and (ii) notify the first entity of the impact of the computing network-based event on the pre-configured acquisition.

In specific embodiments of the system, the impact event tracking module is further configured to determine that the impact of the event on the pre-configured acquisition exceeds a predetermined impact threshold prior to performing at least one of preventing occurrence of the computer network-based event and notifying the first entity of the impact of the event.

In other specific embodiments of the system, the impact event tracking module is further configured to, in response to determining the impact, prevent occurrence of an entirety of the computer network-based event.

In still further specific embodiments of the system, the impact event tracking module is further configured to, in response to determining the impact, prevent occurrence of at least a portion of the computer network-based event by communicating a signal to a network-based entity that processes the computer network-based event, wherein the signal is configured to prevent at least a portion of the computer network-based event from proceeding. In other related embodiments the system includes a mobile computing device having a memory and a processor in communication with the memory, such that the memory stores a digital resource application configured to provide digital user credentials to a network-based entity for initiating the computer network-based event. In such embodiments of the system, the impact event tracking module is further configured in response to determining the impact, prevent occurrence of at least a portion of the computer network-based event by preventing the digital resource application from providing the user credentials to the network-based entity.

In further specific embodiments of the system, the impact event tracking module is further configured to determine one or more attributes associated with the computing network-based event and, in response to determining the impact, prevent occurrence of at least a portion of the computer network-based event when at least one of attributes associated with the computing network-based event satisfy predetermined attribute criteria.

In other specific embodiments of the system, the impact event tracking module is further configured to, in response to determining the impact, notify the first entity of the impact of the event by communicating an alert to the first entity that indicates the impact of the event of the pre-configured acquisition.

In still further specific embodiments of the system, the pre-configured acquisition of the resource provided to the first entity is further defined as one a pre-commitment to acquire the resource or a goal to acquire the resource by the first entity.

In another specific embodiment of the system, the impact event tracking module is further configured access the distributed computing network to retrieve, from the database, the information related to the pre-configured acquisition, wherein the information includes current status of the pre-configured acquisition and remaining actions necessary to complete the pre-configured acquisition.

Moreover, in other specific embodiments of the system, the network-based event is defined as a financial transaction. In such embodiments of the system, the impact event tracking module is further configured to determine a financial impact of the financial transaction on the pre-configured acquisition based on at least one parameter associated with the event, such as transaction amount and the information related to the pre-configured acquisition, such as an outstanding balance amount. In further related embodiments of the system, the impact event tracking module is further configured to, in response to determining the impact, notify the first entity of the impact of the computing network-based event on the pre-configured acquisition by generating and communicating an alert to the first entity. The alert may be configured to include at least one of (i) an effect on the pre-configured acquisition of the resource based on foregoing the financial transaction, and (ii) an effect on the pre-configured acquisition of the resource based on proceeding with the financial transaction. In further specific embodiments of the invention, the alert is configured to includes an image or graphical representation of the pre-configured acquisition, more specifically in some embodiments, the image or the graphical representation is configured to be altered/diminished in proportion to the impact of the financial transaction on the pre-configured acquisition.

In still further specific embodiments the system further includes a pre-configured acquisition progress tracking module configured to track the first entity's progress toward acquiring the pre-configured acquisition of the resource.

An apparatus for monitoring events having an effect on a pre-configured acquisition defines second embodiments of the invention. The apparatus includes a computing platform including a memory and at least one processor in operable communication with the memory. The apparatus further includes an impact event tracking module that is stored in the memory and executable by the processor. The module is configured to receive an input that indicates an imminent occurrence of a computing network-based event having a potential impact on a pre-configured acquisition of resources by a first entity and, in response to receiving the input, access a distributed computing network to retrieve, from a database, information related to the pre-configured acquisition. In response to retrieving the information, the module is further configured to determine an impact of the computing network-based event on the pre-configured acquisition based on at least one parameter associated with the computing network-based event and the information related to the pre-configured acquisition. The module is further configured to, in response to determining the impact, perform at least one of (i) prevent occurrence of at least a portion of the computer network-based event and (ii) notify the first entity of the impact of the computing network-based event on the pre-configured acquisition.

A computer program product comprising at least one non-transitory computer-readable medium having computer-readable program code portions embodied therein defines third embodiments of the invention. The computer-readable program code portions includes an executable portion configured for receiving an input that indicates an imminent occurrence of a computing network-based event having a potential impact on a pre-configured acquisition of resources by a first entity. The computer-readable program code portions further includes an executable portion configured for accessing a distributed computing network to retrieve, from a database, information related to the pre-configured acquisition. In addition, the computer-readable program code portions includes an executable portion configured for determining an impact of the computing network-based event on the pre-configured acquisition based on at least one parameter associated with the computing network-based event and the information related to the pre-configured acquisition. Moreover, the computer-readable program code portions includes an executable portion configured for, in response to determining the impact, performing at least one of (i) prevent occurrence of at least a portion of the computer network-based event, and (ii) notify the first entity of the impact of the computing network-based event on the pre-configured acquisition.

Thus, as described in more detail below, embodiments of the invention providing for establishing and maintaining a database of pre-configured acquisitions of resources and tracking/monitoring computer network-based events that may potentially have an impact on the pre-configured acquisitions of resources. When a determination is made that a computer network-based event is imminent, the impact of the event is determined based on parameters associated with the event and attributes associated with the pre-configured acquisition. Once the impact of the event has been determined and, in some embodiments the level of impact, at least a portion of the event is prevented from occurring and/or the entity associated with the pre-configured acquisition is notified of the impact of the event on the pre-configured acquisition.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
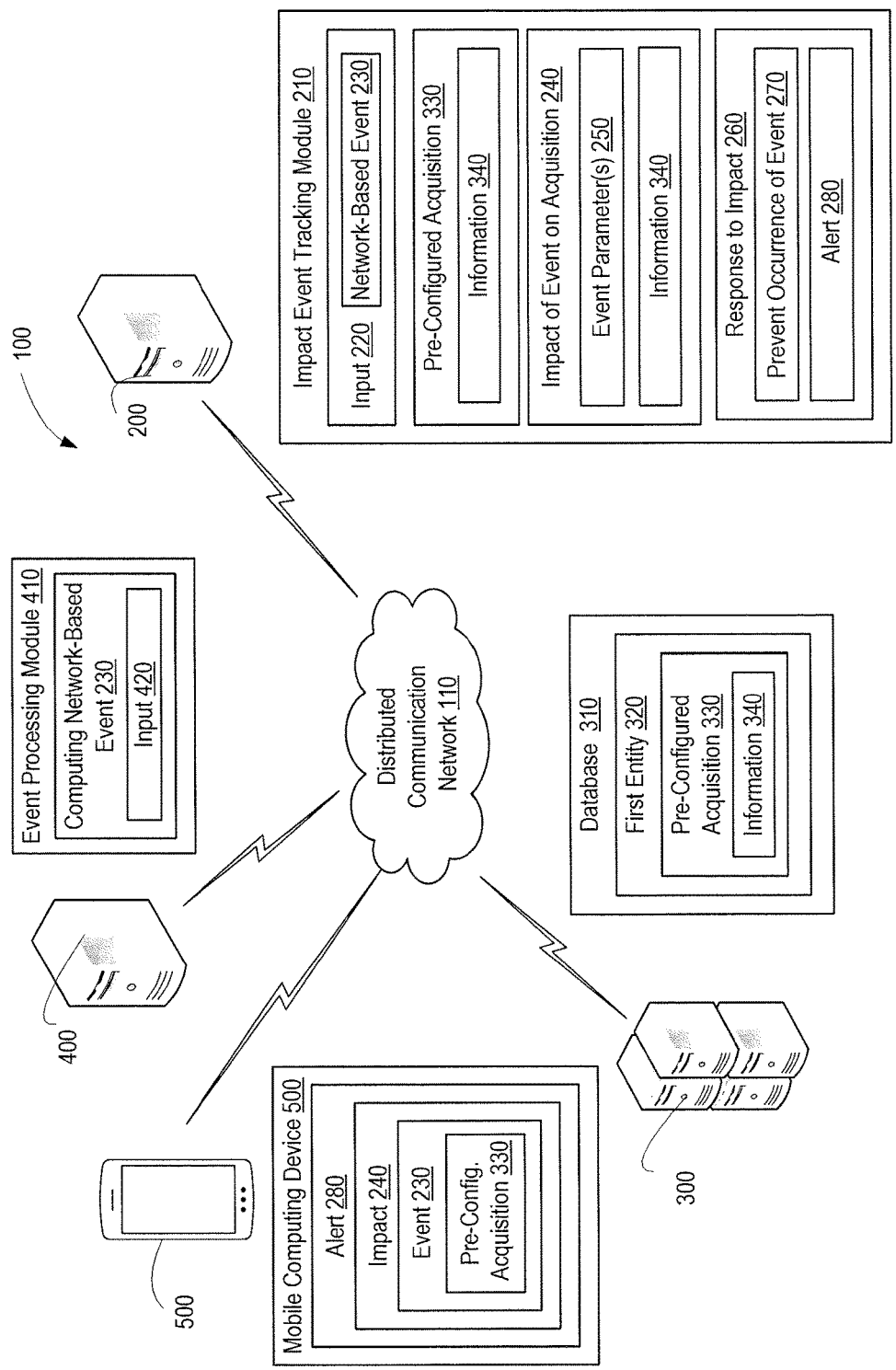
Figure 2:
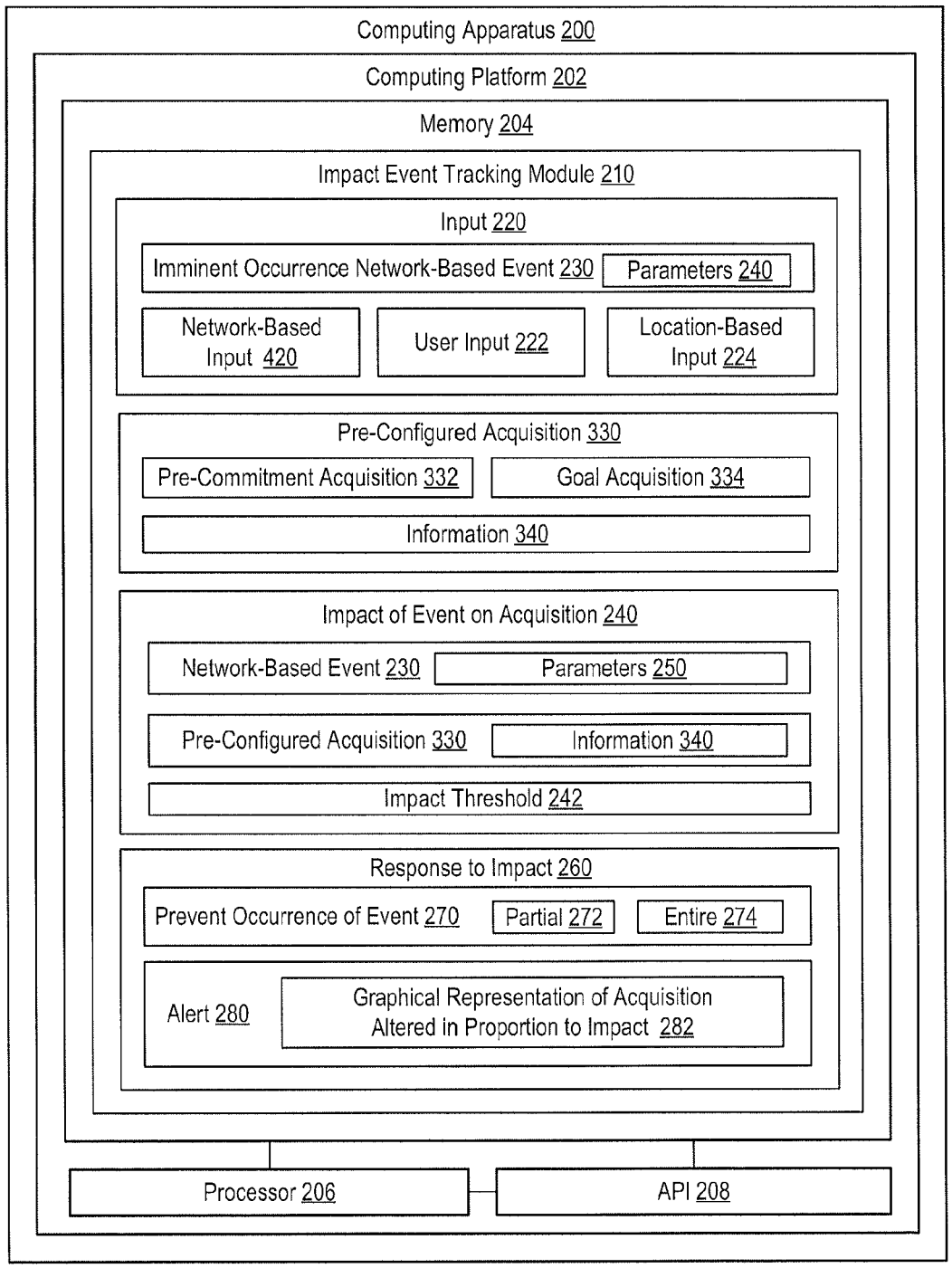
Figure 3:
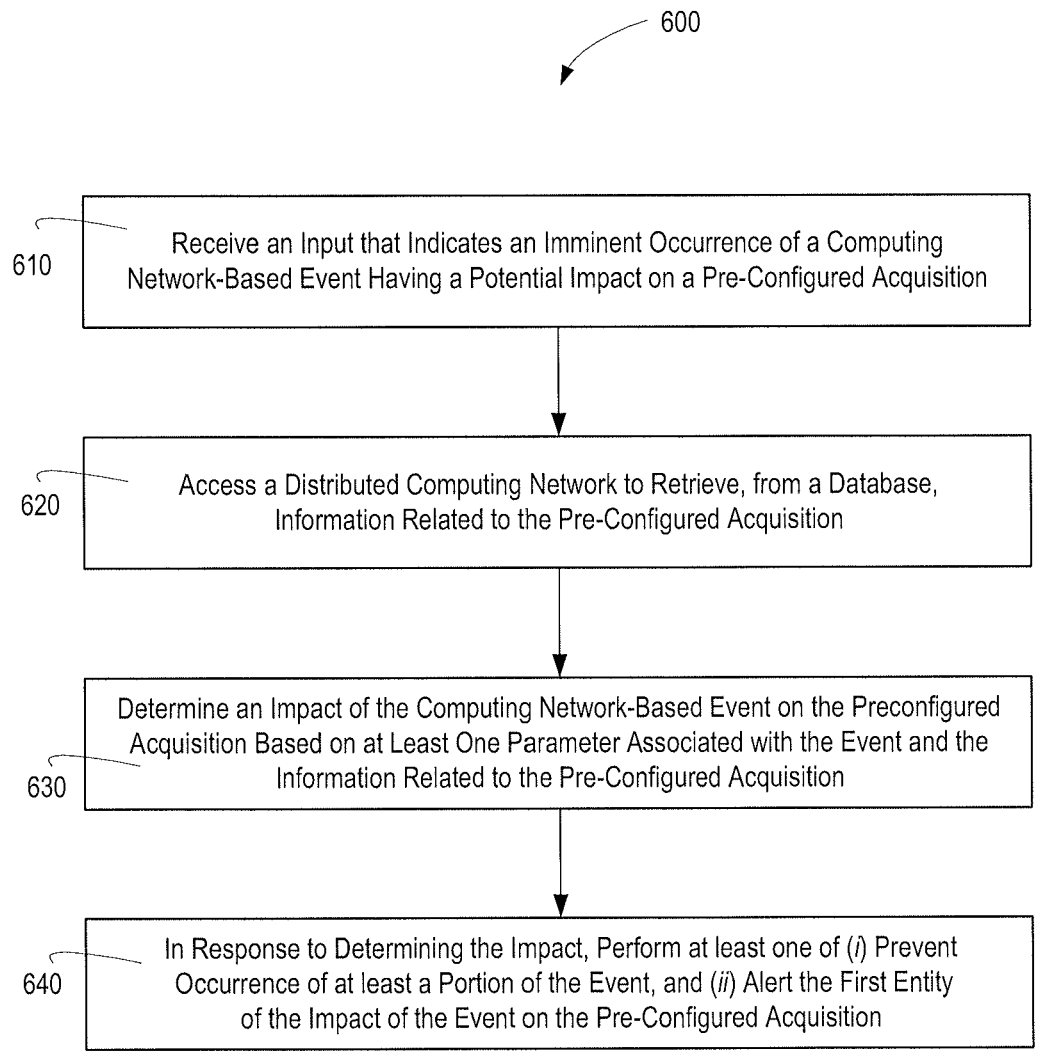

Having thus described embodiments of the invention in general terms, reference will now be made to the accompanying drawings, which are not necessarily drawn to scale, and wherein:

FIG. 1 is a schematic diagram depiction of a system for monitoring events having an impact on a pre-configured acquisition of resources, according to an embodiment of the present invention;

FIG. 2 is a block diagram of a computing apparatus configured for monitoring events having an impact on a pre-configured acquisition of resources, in accordance with embodiments of the present invention; and FIG. 3 is a flow diagram of a method for monitoring events having an impact on a pre-configured acquisition of resources, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Systems, apparatus, and the like described in detail below provide for establishing and maintaining a database of pre-configured acquisitions of resources and tracking/monitoring computer network-based events that may potentially have an impact on the pre-configured acquisitions of resources. When a determination is made that a computer network-based event is imminent, the impact of the event is determined based on parameters associated with the event and attributes associated with the pre-configured acquisition. Once the impact of the event has been determined and, in some embodiments the level of impact, at least a portion of the event is prevented from occurring and/or the entity associated with the pre-configured acquisition is notified of the impact of the event on the pre-configured acquisition.

Referring to FIG. 1, a schematic diagram is provided of a system 100 for monitoring events having an impact on pre-configured acquisition of resources, in accordance with embodiments of the present invention. The system 100 is implemented via a distributed communication network 110, such as the Internet, intranets and combinations thereof, capable of communicating, via wired and/or wireless connections, data between communication devices.

The system includes a server device 300 configured to store database 310. Database 310 is configured to store information 340 related to pre-configured acquisitions 330 of resources provided to a first entity 320 by a second entity (not shown in FIG. 1).

The system further includes network device 200, which may comprise a server, a personal computer, a laptop computer or the like, The network device 200 stores impact event tracking module 210 that is configured to monitor/track events that have an impact on the pre-configured acquisition 330 of resources. The impact event tracking module 210 is configured to receive an input 220 that indicates an imminent occurrence of a computer-network based event 230 having a potential impact on the pre-configured acquisition 330 of resources. In specific embodiment of the system 100, the input 220 is received from network device 400, which may comprise a server or the like, that is configured to execute event processing module 410. Event processing module 410 is configured to process computing-network based event 230 and provide a notification/signal 420 to the impact event tracking module 210 that the event is imminent. In other embodiments of the invention, the input 220 may be automatically provided to the module 210 based on a location of the first entity (e.g., the mobile computing device 500 of the first entity) or the first entity may manually provide a user input.

In response to receiving the input 220, the module 210 is configured to access database 310 to retrieve the information 340 associated with the pre-configured acquisition 330 of resources and implement the information 340 and one or more parameters 250 related to the event 230 to determine an impact 240 of the event on the pre-configured acquisition 330 of resources.

In response to determining the impact 240, the module 210 is further configured to provide a response 260 to the impact 240. The response 260 may include at least one of (i) preventing the occurrence 270 of at least a portion of the event 230, and/or (ii) notifying/alerting 280 the first entity of the impact 240 of the event 230 on the pre-configured acquisition 330 of resources. In specific embodiments notifying 280 may include generating and communicating an alert 280 to a mobile communication device 500 associated with the first entity, such that the first entity receives a real-time (i.e., prior to occurrence of the event 230) notification of the impact 240 of the event 230 on the pre-configured acquisition 330 of resources.

Referring to FIG. 2, a block diagram is depicted of apparatus 200 that highlights various additional aspects of the impact event tracking module 100 herein disclosed. The apparatus 200 may include any type of one or more computerized, communication devices, such as a server, a personal computer, a portable computer, or any device or devices that include a computing platform and have a wired and/or wireless connection to a network or the Internet.

The apparatus 200 includes computing platform 202 that can transmit data across a network, and that can receive and execute routines and applications. Computing platform 202 includes memory 204, which may comprise volatile and non-volatile memory such as read-only and/or random-access memory (RAM and ROM), EPROM, EEPROM, flash cards, or any memory common to computing platforms. Further, memory 204 may include one or more flash memory cells, or may be any secondary or tertiary storage device, such as magnetic media, optical media, tape, or soft or hard disk.

Further, computing platform 202 also includes processor 206, which may be an application-specific integrated circuit ("ASIC"), or other chipset, logic circuit, or other data processing device. Processor 206 or other processor such as ASIC may execute an Application Programming Interface ("API") 208 that interfaces with any resident programs, such as impact event tracking module 210 stored in the memory 204 of the apparatus 200.

Processor 206 includes various processing subsystems (not shown in FIG. 2) embodied in hardware, firmware, software, and combinations thereof, that enable the functionality of apparatus 200 and the operability of the apparatus 200 on a network (110 of FIG. 1). For example, processing subsystems allow for initiating and maintaining communications, and exchanging data, with other networked devices. For the disclosed embodiments, processing subsystems of processor 206 may include any subsystem used in conjunction with impact event tracking module 210.

Computing platform 202 additionally includes communications module (not shown in FIG. 2) embodied in hardware, firmware, software, and combinations thereof, that enables communications among the various components of the apparatus 200, as well as between the apparatus 200 and an external network (110 of FIG. 1), such as the Internet or the like. In described embodiments, the communication module enables the communication of all correspondence between apparatus 200 and other computing devices, such as network devices 300 and 400 and mobile computing device 500 (shown in FIG. 1).

As previously noted and discussed, the memory 204 of computing platform 202 includes the impact event tracking module 410 that is configured to track/monitor events having an impact on pre-configured acquisitions, in accordance with embodiments of the present invention.

The impact event tracking module 210 is configured to receive an input 220 that indicates an imminent occurrence of a computer-network based event 230 having a potential impact on the pre-configured acquisition 330 of resources. In specific embodiment of the system 100, the input 220 may be a network-based input 420. For example, in those embodiments of the invention in which the event is a purchase transaction, the network-based input may be received from a Point-Of-Sale (POS) system that is configured to process purchase transactions either online or at physical locations (i.e., at a brick-and-mortar merchant). In such embodiments of the invention, the input 420 is configured to be received once the POS system receives an input that initiates a purchase transaction (e.g., card swipe, data entry or the like) but prior to processing the purchase transaction. In other embodiments of the invention, the input may be a user input 212 received from the first entity while contemplating an imminent event. For example, a user contemplating a purchase transaction may input various parameters associated with the contemplated purchase transaction, such as amount of purchase being contemplated, goods/service or type of goods/services being contemplated and the like. In other embodiments of the invention, the input 210 may be a location-based input 214. For example, the first entity/user may be determined to be located (via location determining means in a mobile communication device possessed by the first entity/user) at or proximate to a merchant (e.g., the first entity/user is entering or located within a department store) or the first entity/user may be determined to be virtually located (via IP address associated with a web page or the like) at a commercial website (e.g., the first entity/user has accessed an online store front/home page or the like). Such determination of a pre-configured location, physical or virtual, which may be configured by the module 210 or, in some embodiments, by the first entity/user, may trigger an automatic input 214 to the module 210.

In response to receiving the input 220, the module 210 is configured to access database 310 to retrieve the information 340 associated with the pre-configured acquisition 330 of resources and implement the information 340 and one or more parameters 250 related to the event 230 to determine an impact 240 of the event on the pre-configured acquisition 330 of resources. In specific embodiments of the invention, the pre-configured acquisition 330 of resources is further defined as a pre-commitment 332 (e.g., contractual agreement) acquisition made between the first entity and a second entity (e.g., merchant, financial institution or the like). Pre-commitment acquisition 332 may provide for the first entity to make partial payments on a regularly basis or for the first entity to provide the entire payment at a predetermined time in the future. In specific embodiments of the invention, the first entity may be in possession of the services or goods prior to full payment or initial payment, while in other embodiments of the invention, the first entity does not gain possession of the service or good until a certain amount of payment or percentage of full payment is received or until payment is received in full. In specific such embodiments of the invention, second entity may be configured to leverage information known about the first entity in determining what types or products or services to offer to the first entity as pre-configured acquisitions 330. For example, a financial institution may rely of a first entity/user financial transaction history to determine what services or goods to offer to the first entity/user based on their financial transaction history. In additional embodiments of the invention, the second entity may aggregate information from across a first entity population (e.g., aggregate information from a plurality of customers, such as aggregated purchase history information) and leverage this information to acquire services and/or goods from third-party providers/suppliers at a discounted rate, in some embodiments, in advance of pre-configured acquisition by the first entities, while in other embodiments, acquisition of the services and/or goods by the second entity may occur in response to pre-configured acquisition and, specifically, in response to a predetermined quantity of pre-configured acquisitions (e.g., a certain volume of customers commit to purchase a service or good, prompting the second entity to acquire the services and/or goods from third-party providers/suppliers at a volume discounted rate.).

In other embodiments of the invention, the pre-configured acquisition, is a goal/desire 334 (i.e., no contractual commitment) of the first entity. For example, the pre-configured acquisition, may be a service (e.g., vacation, travel or the like) or good (e.g., luxury vehicle) that the first entity desires to purchase/acquire in the future.

In those embodiments of the invention, in which the pre-configured acquisition, is the acquisition of goods or services, the information 340 may include details of the acquisition, such as, but not limited to, the overall amount of the acquisition (purchase or lease), the current amount of payments received from the entity towards the acquisition, the current amount of inflow/outflow of financial resources associated with the first entity, the current payment/savings status for the acquisition, the historical payment/savings performance of the first entity as it pertains to the acquisition and the like.

In response to receiving the input 220 and information 340 associated with the pre-configured acquisition 330 of resources, the module 210 is configured to determine the impact 240 of the event 230 on the pre-configured acquisition 330 of resources based on one or more parameters 250 associated with the event 230 and the information 340 related to the pre-configured acquisition 330 of resources. In those embodiments of the invention, in which the event 230 is a financial transaction, the parameters 250 may include, but are not limited to, the purchase amount, the good/service associated with the transaction, the type of good(s)/service(s) associated with the transaction, the merchant or type of merchant associated with the transaction, the type of payment vehicle/account associated with the transaction, the date and time of the transaction and the like. In specific embodiments of the invention, the impact is a monetary amount, while in other embodiments of the invention impact is defined as a certain level of effect on advancing the pre-configured acquisition (e.g., making a payment for the acquisition or making a deposit/savings toward the pre-configured acquisition). In specific embodiments of the invention, once the impact 240 had been determined, a pre-determined impact threshold 242 may be applied to the impact 240 to determine if the impact is sufficient enough to warrant further action (i.e., preventing occurrence of at least a portion of the event and/or alerting the first entity). In specific embodiments of the invention, different impact thresholds 242 may be configured for example, one threshold for preventing occurrence of at least a portion of the event and another, higher threshold for preventing occurrence of the event in its entirety or one threshold for preventing occurrence of at least a portion of the event and another threshold for generating and communicating an alert to the first entity. The impact thresholds 242 may be pre-configured within the module 210 or the module 210 may be configured to allow for the first entity/user to configure the impact thresholds 242.

In response to determining the impact 240 (or that the impact 240 has exceed a designated impact threshold 242), the module 210 is configured to provide a response 260 to the impact 240. In specific embodiments of the invention the response may include preventing occurrence 270 of at least a portion of the event 230. For example, the first entity may configure the module 210 (or the module 210 may be pre-configured) to partially 272 prevent occurrence of the event 230 or prevent occurrence of the event 230 in its entirety 264. For example, in those embodiments in which the event is a purchase transaction, the user may configure certain types of transactions to occur regardless of impact (e.g., purchases for essentials/necessities) or configure for certain items (essential items) within a transaction to be purchased. In those embodiments of the invention in which the event is a purchase transaction, preventing occurrence 270 of the event 230 may provide for signaling the POS system to decline the transaction, providing a signal to a first entity's digital wallet to deny the digital wallet from communicating user credentials to a POS located at/associated with a predetermined merchant and/or for a predetermined period of time and the like.

In other embodiments of the invention, the response 260 to the impact 240, may include, in addition to or in lieu of preventing occurrence of the event 270, generating and communicating an alert 280 to a mobile communication device associated with the first entity/user that serves to notify the first entity/user of the impact of the event 230 on the pre-configured acquisition 330 of resources. In specific embodiments of the invention, the notification may include a graphical representation or depiction of the goods and/or services associated with the acquisition, such that the image is altered (the image fades out or only a portion of the image is shown) in proportion to the amount of impact 240 that the event 230 has on the pre-configured acquisition 330 of resources. In other embodiments of the invention, the notification/alert 280 is configured to show the deficit in savings for the acquisition 330 and/or delay in making payment for the acquisition 330 that will result from the occurrence of the event 230 (e.g., purchase transaction). The alert notification 270 is communicated in real time to the first entity's contemplation of the event, in order for the alert 270 to be received and considered by the first entity, prior to initiating and/or completing the imminent event (e.g., prior to completing the purchase transaction).

Referring to FIG. 3 a flow diagram is presented of a method 600 for monitoring the impact of events on a pre-configured acquisition of resources, in accordance with embodiments of the present invention.

At Event 610, an input is received that indicated an imminent occurrence of a computing network-based event having a potential impact on a pre-configured acquisition of resources. The input may be a network-based input. For example, in those embodiments of the invention in which the event is a purchase transaction, the network-based input may be received from a Point-Of-Sale (POS) system that is configured to process purchase transactions either online or at physical locations (i.e., at a brick-and-mortar merchant).

In other embodiments of the invention, the input may be a user input received from the first entity while contemplating an imminent event. For example, a user contemplating a purchase transaction may input various parameters associated with the contemplated purchase transaction, such as amount of purchase being contemplated, goods/service or type of goods/services being contemplated and the like. In other embodiments of the invention, the input may be a location-based input. For example, the first entity/user may be determined to be located (via location determining means in a mobile communication device possessed by the first entity/user) at or proximate to a merchant (e.g., the first entity/user is entering or located within a department store) or the first entity/user may be determined to be virtually located (via IP address associated with a web page or the like) at a commercial website (e.g., the first entity/user has accessed an online store front/home page or the like). The pre-configured acquisition of resources may be a pre-committed (e.g., contractual requirement) acquisition of resources or a goal/desire to acquire the resources.

At Event 620, a database, accessible over a distributed communication network, is accessed to retrieve information related to the pre-configured acquisition. The information may include details of the acquisition, such as, but not limited to, the overall amount of the acquisition (purchase or lease), the current amount of payments received from the entity towards the acquisition, the current amount of inflow/outflow of financial resources associated with the first entity, the current payment/savings status for the acquisition, the historical payment/savings performance of the first entity as it pertains to the acquisition and the like.

At Event 630, the impact of the computer network-based event on the pre-configured acquisition of resources is determined based on at least one parameter associated with the event and the information related to the pre-configured acquisition. The parameters associated with the event may include, but are not limited to, the purchase amount, the good/service associated with the transaction, the type of good(s)/service(s) associated with the transaction, the merchant or type of merchant associated with the transaction, the type of payment vehicle/account associated with the transaction, the date and time of the transaction and the like.

At Event 640, in response to determining the impact or determining that the impact meets or exceeds at least one impact threshold, the method performs at least one of (i) preventing occurrence of at least a portion of the event and/or (ii) alerting/notifying the first entity/user of the impact of the event on the pre-configured acquisition of resources. In this regard, the event may be prevented in part or in total depending on the parameters of the event (e.g., type of purchase transaction and/or items in the purchase transaction or the like). In addition, the alert may be configured to depict the resources in a diminishing capacity based on the level of impact (e.g., fading or cropped in proportion to the amount of the impact that the event has on the acquisition of the resources). In addition, the alert may include the level of impact on the acquisition in terms of delay in acquiring, delay in making payment/savings or the like.

Thus, methods, systems, computer program products and the like that have been described above provide for pre-configured resource acquisition are established and maintained in a database. The occurrence or imminent occurrence of an computer network-based event that impacts the pre-configured resource acquisition are monitored or tracked and, based on the determined impact of the computer network-based event, at least one of the occurrence of the computer network-based event is prevented or the user is notified of the impact of the computer-network based event on the pre-configured resource acquisition While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for monitoring events having an effect on a pre-configured acquisition of resources, the system comprising:
   a database accessible across a distributed computing network, wherein the database is configured to store information related to a pre-configured acquisition of a resource provided to a first entity by a second entity;
   a computing platform including a memory and at least one processor in operable communication with the memory; and
   an impact event tracking module stored in the memory, executable by the processor and configured to:
      receive an input that indicates an imminent occurrence of a computing network-based event having a potential impact on the pre-configured acquisition;
      access the distributed computing network to retrieve, from the database, the information related to the pre-configured acquisition;
      determine an impact of the computing network-based event on the pre-configured acquisition based on at least one parameter associated with the computing network-based event and the information related to the pre-configured acquisition; and
      in response to determining the impact, perform at least one of (i) prevent occurrence of at least a portion of the computer network-based event and (ii) notify the first entity of the impact of the computing network-based event on the pre-configured acquisition.

2. The system of claim 1, wherein the impact event tracking module is further configured to determine that the impact of the event on the pre-configured acquisition exceeds a predetermined impact threshold prior to performing at least one of preventing occurrence of the computer network-based event and notifying the first entity of the impact of the event.

3. The system of claim 1, wherein the impact event tracking module is further configured to, in response to determining the impact, prevent occurrence of an entirety of the computer network-based event.

4. The system of claim 1, wherein the impact event tracking module is further configured to, in response to determining the impact, prevent occurrence of at least a portion of the computer network-based event by communicating a signal to a network-based entity that processes the computer network-based event, wherein the signal is configured to prevent at least a portion of the computer network-based event from proceeding.

5. The system of claim 4, wherein the impact event tracking module is further configured in response to determining the impact, prevent occurrence of at least a portion of the computer network-based event by preventing the digital resource application from providing the user credentials to the network-based entity.

6. The system of claim 4, wherein the impact event tracking module is further configured to determine one or more attributes associated with the computing network-based event and, in response to determining the impact, prevent occurrence of at least a portion of the computer network-based event when at least one of attributes associated with the computing network-based event satisfy pre-determined attribute criteria.

7. The system of claim 1, wherein the system further a mobile computing device having a memory and a processor in communication with the memory, wherein the memory stores a digital resource application configured to provide digital user credentials to a network-based entity for initiating the computer network-based event.

8. The system of claim 1, wherein the impact event tracking module is further configured to, in response to determining the impact, notify the first entity of the impact of the event by communicating an alert to the first entity that indicates the impact of the event of the pre-configured acquisition.

9. The system of claim 1, wherein the pre-configured acquisition of the resource provided to the first entity is further defined as one a pre-commitment to acquire the resource by the first entity.

10. The system of claim 1, wherein the impact event tracking module is further configured access the distributed computing network to retrieve, from the database, the information related to the pre-configured acquisition, wherein the information includes current status of the pre-configured acquisition and remaining actions necessary to complete the pre-configured acquisition.

11. The system of claim 1, wherein the impact event tracking module is further configured to receive the input that indicates an imminent occurrence of a computing network-based event having a potential impact on the pre-configured acquisition, wherein the network-based event is a financial transaction.

12. The system of claim 11, wherein the impact event tracking module is further configured to determine a financial impact of the financial transaction on the pre-configured acquisition based on at least one parameter associated with the event and the information related to the pre-configured acquisition, wherein the at least one parameter includes transaction amount and the information related to the pre-configured acquisition includes an outstanding balance amount.

13. The system of claim 12, wherein the impact event tracking module is further configured to, in response to determining the impact, notify the first entity of the impact of the computing network-based event on the pre-configured acquisition by generating and communicating an alert to the first entity.

14. The system of claim 13, wherein the impact event tracking module is further configured to, in response to determining the impact, generate and communicate the alert to the first entity, wherein the alert includes at least one of (i) an effect on the pre-configured acquisition of the resource based on foregoing the financial transaction, and (ii) an effect on the pre-configured acquisition of the resource based on proceeding with the financial transaction.

15. The system of claim 13, wherein the impact event tracking module is further configured to, in response to determining the impact, generate and communicate the alert to the first entity, wherein the alert includes an image or graphical representation of the pre-configured acquisition.

16. The system of claim 15, wherein the impact event tracking module is further configured to, in response to determining the impact, generate and communicate the alert to the first entity, wherein the alert includes the image or the graphical representation of the pre-configured acquisition, wherein the image or the graphical representation is configured to be altered in proportion to the impact of the financial transaction on the pre-configured acquisition.

17. The system of claim 1, wherein the system further includes a pre-configured acquisition progress tracking module configured to track the first entity's progress toward acquiring the pre-configured acquisition of the resource.

18. An apparatus for monitoring events having an effect on a pre-configured acquisition of resources, the apparatus comprising:
   a computing platform including a memory and at least one processor in operable communication with the memory; and
   an impact event tracking module stored in the memory, executable by the processor and configured to:
      receive an input that indicates an imminent occurrence of a computing network-based event having a potential impact on a pre-configured acquisition of resources by a first entity;
      access a distributed computing network to retrieve, from a database, information related to the pre-configured acquisition;
      determine an impact of the computing network-based event on the pre-configured acquisition based on at least one parameter associated with the computing network-based event and the information related to the pre-configured acquisition; and
      in response to determining the impact, perform at least one of (i) prevent occurrence of at least a portion of the computer network-based event and (ii) notify the first entity of the impact of the computing network-based event on the pre-configured acquisition.

19. A computer program product, the computer program product comprising at least one non-transitory computer-readable medium having computer-readable program code portions embodied therein, the computer-readable program code portions comprising:
   an executable portion configured for receiving an input that indicates an imminent occurrence of a computing network-based event having a potential impact on a pre-configured acquisition of resources by a first entity;
   an executable portion configured for accessing a distributed computing network to retrieve, from a database, information related to the pre-configured acquisition;
   an executable portion configured for determining an impact of the computing network-based event on the pre-configured acquisition based on at least one parameter associated with the computing network-based event and the information related to the pre-configured acquisition; and an executable portion configured for, in response to determining the impact, performing at least one of (i) prevent occurrence of at least a portion of the computer network-based event and (ii) notify the first entity of the impact of the computing network-based event on the pre-configured acquisition.

* * * * *